United States Patent [19]

Morganstern

[11] Patent Number: 4,537,734

[45] Date of Patent: Aug. 27, 1985

[54] METHOD FOR REDUCING THE MONOMER CONTENT IN ACRYLONITRILE CONTAINING POLYMERS

[75] Inventor: Kennard H. Morganstern, Roslyn, N.Y.

[73] Assignee: Radiation Dynamics, Inc., Melville, N.Y.

[21] Appl. No.: 19,616

[22] Filed: Mar. 12, 1979

Related U.S. Application Data

[63] Continuation-in-part of Ser. No. 4,046, Jan. 17, 1979, abandoned, which is a continuation of Ser. No. 840,415, Oct. 7, 1977, abandoned.

[51] Int. Cl.³ .................... C08F 6/28; C08F 220/44; C08J 3/28; C08J 7/10
[52] U.S. Cl. .................................. 264/22; 204/159.16
[58] Field of Search ............ 204/159.14, 159.2, 159.16

[56] References Cited

U.S. PATENT DOCUMENTS

| | | | |
|---|---|---|---|
| 2,921,006 | 1/1960 | Schmity et al. ................. | 204/159.15 |
| 3,252,880 | 5/1966 | Magat et al. ..................... | 204/154 |
| 3,694,535 | 9/1972 | Kimoto et al. ................... | 264/102 |
| 3,773,740 | 11/1973 | Szabo ............................... | 260/93.5 A |
| 3,846,521 | 11/1974 | Osterholtz ........................ | 264/22 |
| 3,870,802 | 3/1975 | Harris et al. ..................... | 525/158 |
| 3,929,602 | 12/1975 | Kaetsu et al. ................... | 204/159.22 |
| 4,086,411 | 4/1978 | Nagano et al. .................. | 528/480 |

FOREIGN PATENT DOCUMENTS

| | | |
|---|---|---|
| 7341267 | 12/1973 | Japan . |
| 820120 | 9/1959 | United Kingdom . |
| 867646 | 5/1961 | United Kingdom . |
| 960192 | 6/1964 | United Kingdom . |
| 1101087 | 1/1968 | United Kingdom . |
| 1367245 | 9/1974 | United Kingdom . |

OTHER PUBLICATIONS

Chapiro, Radiation Chemistry of Polymeric Systems, Wiley & Sons, pp. 446–449, (1962).

Fydelor, "Radiation-Induced Reactions—", European Polymer Journal, 1971, vol. 7, pp. 401–404, Pergammon Press.

Dole, "The Radiation Chemistry of Macromolecules", vol. 2, 1973, Academic Press, pp. 90–93.

*Primary Examiner*—John C. Bleutge
*Assistant Examiner*—A. H. Koeckert
*Attorney, Agent, or Firm*—Howard L. Rose

[57] ABSTRACT

The monomer content in acrylonitrile containing polymers, as for example bottles formed from acrylonitrile/styrene copolymer, is substantially reduced by applying ionizing radiation at conventional rates in low dosage levels.

16 Claims, No Drawings

METHOD FOR REDUCING THE MONOMER CONTENT IN ACRYLONITRILE CONTAINING POLYMERS

CROSS-REFERENCE TO RELATED APPLICATIONS

This application is a continuation-in-part of my co-pending application, Ser. No. 004,046, filed Jan. 17, 1979, now abandoned, which in turn is a continuation of my application, Ser. No. 840,415 filed Oct. 7, 1977 now abandoned.

THE INVENTION

This invention relates to the reduction of residual monomer content in acrylonitrile polymers.

BACKGROUND OF THE INVENTION

In recent years the art has given substantial consideration to the possibility of replacing the "standard" glass bottle with so-called plastic containers. In particular acrylonitrile containing polymers have been suggested for this purpose because of their useful barrier properties. Specifically, an acrylonitrile/styrene copolymer has been employed to form beverage containers capable of withstanding considerable internal gas pressure. Unfortunately some test studies indicate that acrylonitrile itself might be a carcinogen. Moreover when acrylonitrile monomer is present in the polymer, e.g., in copolymer pellets or an article or even initially in the polymer while in suspension or solution form, detectable, and perhaps significant, quantities of acrylonitrile and/or perhaps lower polymers of acrylonitrile may be leached out of the article during use. Concern exists, therefore, over the content of residual monomer, principally of acrylonitrile, in polymer articles or in the polymer even when still in solution or suspension form and specifically over the migration of monomer and lower polymer components from plastic bottles or other food containers into the food products contained in them.

Manifestly, the manufacturer of the polymers (homo or co-) and the plastic containers made therefrom employ polymerization and polymer treating techniques that are adapted to minimize the monomer content in the container walls. However, despite their best efforts to provide monomer-free polymer for the container forming operation and to avoid degradation of the polymer during the container forming operations, a residual acrylonitrile (monomer) content of 1 ppm-100 ppm in the container walls can almost always be found.

Any solution to the problem of monomer content in the container walls and migration of monomer from the container may not be divorcable from difficulties already known to the art. In particular, attention has been directed to the appearance of an extractable HCN content in packaging materials formed from nitrile polymers, including of course the acrylonitrile/styrene polymers, reference being made, in this regard, to U.S. Pat. No. 3,870,802. For example, containers believed to have been made according to practice of U.S. Pat. No. 3,870,802 (presumably from the polymeric nitrile resins described in that patent) tested out as having just less than 20 ppb (in the extract) of extractable HCN therein.

On the whole it is believed that as a practical matter, a monomer removing treatment should be carried out after the acrylonitrile polymer has been polymerized. Moreover, the treatment must avoid creating harmful side effects, such as for example creation of sufficient extractable HCN to affect end use of the polymer in food containers.

THE INVENTION

Generally speaking, the process of this invention comprises treating acrylonitrile containing polymers, including notably acrylonitrile/styrene copolymers and acrylonitrile/butadiene/styrene polymers with ionizing radiation at conventional rates within the dosage range of 0.05-2.0 megarads whereby the extractable monomer content is significantly reduced. What constitutes a "conventional rate" will vary depending upon the parameters of the system employed. For most bottles and food packages, significant monomer reduction is achieved using electron beam irradiation rates of about 0.007 to 2.00 mrads/sec. or more. Using cobalt source irradiation the rate may be as low as about 1/1000 of these rates.

What constitutes a significant reduction of monomer will of course depend upon the amount of residual monomer present before treatment and the end amount that can be tolerated. For the purpose of this invention, in most instances, reduction of greater than about 50 wt. %, preferably greater than 60 wt. % and at times greater than 90 wt. % are achievable. In certain instances, the results can approach being almost 100%.

Optionally, the irradiation treatment can be followed by washing or other treatment intended to outgas HCN from the polymer. An outgassing treatment is particularly desirable when the irradiation dosage has been in the upper dosage ranges such as, at about 0.5-2.0 megarads.

RATIONALE OF THE INVENTION

Ionizing radiation, e.g., from an electron beam generator, is known to create many unpredictable results including, at times, complex and sometimes competing reactions. For example, irradiation is known to induce polymerization of acrylonitrile. When applied to some polymers, irradiation is known to cause cross-linking, chain scission (something that might generate undesirable by-products such as HCN), generation of gases, etc. In some instances physical properties of the polymer are improved. Examples include polyethylene subjected to 20-30 megarads; polyvinyl chloride incorporating a pro-rad as a polyfunctional acrylate when subjected to 2-5 megarads; and polyvinylidine fluoride when subjected to more than 8 megarads. In other polymers, however, other consequences (such as chain scission) equal, or even predominate over reactions such as cross-linking, and degradation occurs, as for example, in butyl rubbers; in Teflon; and in cellulosics. Still other polymers, including acrylonitrile containing plastics and polystyrene are largely unaffected by irradiation, particularly in what is considered to be a conventional dosage area, i.e., 2-10 megarads. For this reason, in fact, polystyrene has been employed in components of electron beam generators.

In summary, polymers fall generally into three categories: those that are degraded by irradiation, for instance, butyl rubber; those that are either unaffected or only slightly affected by irradiation except at quite high dose levels at which certain color and perhaps other deleterious changes occur, such as polystyrene and some polymers containing polyacrylonitrile; and those polymers whose physical properties are improved by irradiation such as polyethylene. In this latter category improvements are typically found with irradiation doses in the range of 10-30 megarads and if a pro-rad is included, in the range of 2-10 megarads. In both of these cases the effect of irradiation decreases with dosage and the effects virtually disappear at about the lower end of the dose range. Superficially then, it would seem that what is considered to be a low dosage, i.e., 2-10 megarads, would offer little hope in the absence of a pro-rad for improving polymer properties in any respect, and, indeed, trials known to the inventor hereof, produced little or no physical improvement in tensile strength of polystyrene or of polyacrylonitrile containing plastics.

It has now been found, however, that the near zero irradiation range of 0.05-2.0 megarads is anamolous. Surprisingly, significant reductions of residual acrylonitrile monomer in container walls are obtained from irradiation at, for example, about 0.2-0.3 megarads. Physical properties of the polymers (including color) are almost totally unchanged by less than 0.5 megarads.

Although no across the board investigation has been made, it now appears that this near zero range of irradiation is anomolous for a substantial number of polymers. Such polymers respond differently in the 0.05-2.0 megarad range than they do in the 2-10 megarad range. Certainly the response of nitrile polymers is different at the 0.05-0.5 range. Specifically the monomer acrylonitrile therein is reduced significantly, e.g., from about 50% to 90% or more. Significant chain scission does not appear to occur. Cross-linking, as measured by changes in rheologic properties does not appear to be significant.

It is believed that the reduction in residual monomer and essential absence of cross-linking and low level of HCN generation in the instance of acrylonitrile polymers are explainable in terms of the G-value for the reactions involved. The G-value for monomer attachment, in the instance of acrylonitrile, is several orders of magnitude higher than the G-value for chain scission of the polymer. In essence then the 0.05-2.0 megarad dosage of high energy radiation at conventional rates herein preferred constitutes sufficient radiation to scavenge (by attachment) the small proportions of monomer within the polymer without being sufficient radiation to cause a material level of chain scission in the polymer. Release of HCN is probably attributable to a scission reaction at a side chain.

In terms of the present invention significant reduction of trace monomer content as almost the only consequence of very low level irradiation is precisely the desired result. Generation of HCN in the nitrile polymer which does occur is a minor side-effect, because the extraction levels in leachants are in parts per billion, and moreover can be reduced back to below 20 ppb in leachant by an outgassing treatment performed on the article such as washing, storage under elevated temperatures, or the like.

DETAILED PRACTICE OF THE INVENTION

The practice of this invention is applicable to the full range of polymeric articles formed from acrylonitrile monomers, whether the polymer is in solution, suspension, pellet, finished article or some other form. The process of this invention, however, is especially applicable to reducing the monomer content of packaging materials from acrylonitrile polymers containing from 55-85% by wt. (of the total polymer weight) of acrylonitrile alone or of acrylonitrile and methacrylonitrile in amounts up to 16% by wt. (of total polymer weight) and one or more comonomers selected from the gruoup of styrene, alpha methylstyrene, alpha olefins of 2-6 carbon atoms, $C_1$-$C_4$ alkyl esters of acrylic and methacrylic acid, vinyl acetate, $C_1$-$C_4$ alkyl vinyl esters. The process is specifically applicable to the styrene/acrylonitrile bottles and jars containing 60-83% by wt. of acrylonitrile, and to those articles wherein up to 25% by wt. of natural or synthetic rubber is incorporated.

The process is applicable to all of the packaging materials described by Harris et al in their U.S. Pat. No. 3,870,802 with or without presence of formaldehyde therein.

Additional examples of the formulation of copolymers to which the present invention is applicable are:

1. An acrylonitrile/styrene copolymer consisting of the copolymer produced by polymerization of 66-72 parts by weight of acrylonitrile and 23-24 parts by weight of styrene.

2. An acrylonitrile/styrene copolymer consisting of the copolymer produced by polymerization of 45-65 parts by weight of acrylonitrile and 35-55 parts by weight of styrene.

An example of a nitrile rubber modified acrylonitrile methyl acrylate copolymer to which the present invention applies consists of basic copolymers produced by the graft copolymerization of 73-77 parts by weight of acrylonitrile and 23-27 parts by weight of methyl acrylate in the presence of 9-10 parts by weight of butadiene-acrylonitrile copolymers containing approximately 70 percent by weight of polymer units derived from butadiene.

Other systems to which this invention is applicable are various polymer blends containing polyacrylonitrile and/or acrylonitrile copolymers. A particular example of this would include such blends as polyacrylonitrile mixed with a polymer polyol.

As a general proposition, the megarad range of dosage of about 0.05-2.0 at the conventional rates herein contemplated is too low to cause significant degradation, even of sensitive polymers, yet is enough to activate trace quantities of monomer in the polymer, causing (it is theorized) linkage of the previously free monomer molecules to the macromolecules of the polymer. The trace quantities of monomer are sensitive to the radiation probably because of the G-value factor alluded to previously. Tests indicate that about 50% to 90% or more of the monomer content previously extractable from the polymer, is no longer present (at least in an extractable form). The preferred range for the practice of this invention is irradiation within the dosage range of 0.1-1.5 megarad, and when electron beam generation is used, rates on the order of about 0.007 to 2.0 Mrads/sec.

Tests made on high quality bottles of acrylonitrile/styrene polymer (i.e., Cycle Safe ™) indicate that an extractable acrylonitrile content of 5 ppm could be significantly reduced by low level irradiation. In addition further testing has shown that much higher levels of acrylonitrile monomer can be treated by this invention to significantly reduce the level of residual monomer to within acceptable tolerances. Indeed, there appears to be no upper limit on the amount of residual acrylonitrile which can be effectly treated by this invention, given those levels encountered in normal practice.

When the radiation does exceed 0.5 megarads, and notably in the about 0.5-2.0 megarads range, the well known chain scission, cross-linking, etc., reactions attributable to high energy radiation can begin to occur.

The range of 0.5–2.0 megarads is usable on the acrylonitrile polymers, because such polymers are not particularly sensitive to degradation. It is believed that the 0.5–2.0 range is a usable range since side effects, including for example, generation of HCN, cross-linking or polymer scission, are still at a minimum. In total the monomer reduction is considered to be achieved almost entirely at the lower dose, with any further improvement in monomer reduction being believed to be rather nominal. A preferred mode of operation for instance when treatment of the article with more than 0.5 megarad is desired would be a repeat 0.05–0.5 megarad treatment, at the same or less rate.

Also preferred over the 0.5–2.0 megarad range treatment is 0.05–0.5 megarad irradiation of the polymer pellets or ground resin, followed by 0.05–0.5 megarad range treatment of the completed article, usually both being carried out at the same rate, e.g., at about 1 Mrad/sec. for electron beam generation.

As stated above, the practice of this invention is applicable to polymers in many forms, including final form or while in suspension or solution. One variation thereof herein contemplated is the application of the concepts underlying this invention to polymer pellets or ground resin prior to molding into the final article. The pellets or ground resin are subjected to 0.05–0.5 megarads for purposes of reducing the monomer content therein, and then they are processed according to the usual practices in the art. For high quality polymers, treatment of the pellets may suffice to reduce monomer content to acceptable levels, particularly when the end use can tolerate presence of a nominal monomer content in the article. The double treatment, i.e., first of pellets or powder and then of the formed article, can be used on high quality polymer simply to be certain that everything possible has been done to minimize monomer content in the article. Likewise, double or triple treatment can be used by including the polymer in its suspended or solution state, in the treatment.

Reverting back now to treatment in the 0.5–2.0 megarad range, as is also herein contemplated, it is believed that generation of HCN from acrylonitrile polymer is about linear with dosage, and that the extractable HCN content as measured in the leachant would exceed 20 ppb after irradiation at 0.5–2.0 megarad. Accordingly, practice of this invention in the 0.5–2.0 megarad range on articles from nitrile polymers may well include a post-irradiation out-gassing treatment to reduce the HCN content. Such a treatment need be nothing more than storage at mildly elevated temperatures, e.g., 110° F. for an effective period of time (e.g., a few minutes) or a wash with warm water with or without a HCN complexing agent therein. In any event the outgassing treatment reduces HCN content in the article to tolerable (taste) levels. The outgassing treatment is more optional for polymer irradiated in the 0.05–0.5 megarad range.

The actual source of the high energy radiation is not material to the practice of this invention, and, therefore, any of the known to the art (commercially available) radiation sources are contemplated including for example radioactive sources of high energy gamma rays such as radioactive cobalt and electron beam generators such as the "Dynamitron" ®. Accordingly, further description of the high energy radiation source need not be provided, nor is there need to describe the details of the radiation treatment.

For further understanding of this invention reference is made to the following examples of practice thereof.

EXAMPLE 1

32 oz. sectioned bottles of acrylonitrile/styrene copolymers (Monsato Cycle-Safe TM Coca Cola Bottles) were irradiated by an electron beam (Radiation Dynamics, Inc.) generator at 0.10, 0.30 and 0.50 megarads at a rate of about one Mrad per second. The bottles were then tested for residual monomer content after irradiation, and the results compared with monomer levels from the same bottle section not irradiated. In this set of tests only qualitative analyses were carried out, and considerable variation sample to sample was found. The control samples evidenced monomer contents of 1–15 ppm. Comparable samples of irradiated bottle sections also showed variation sample to sample, but within a distinctly lower monomer content range.

Best results were obtained at 0.3 megarads. The monomer content in those samples tested out at 10% or less of the level in the unirradiated samples.

EXAMPLE 2

A like group of "Cycle Safe" ® containers was irradiated at from 0.05–1.0 megarad at a rate of about 1 Mrad/sec. using electron beam generation from a Dynamitron. These bottles were immediately filled with distilled water stored for 2 weeks at 110° F. (in a circulating oven) then the leachant testing for HCN content. The results are tabulated below:

| SAMPLE MARK | HYDROGEN CYANIDE, PPM |
| --- | --- |
| Control | 0.019 |
| 0.05 | 0.052 |
| 0.10 | 0.105 |
| 0.20 | 0.280 |
| 0.30 | 0.350 |
| 0.40 | 0.440 |
| 0.50 | 0.610 |
| 0.75 | 0.760 |
| 1.0 | 1.150 |

Extended storage, even at room temperature, for at least a week reduced the HCN (in leachant) at least 50%. Assuming the reduction in acrylonitrile monomer content in the plastic is proportional to HCN evolution, it can be seen that at low doses acrylonitrile monomer content can be reduced.

EXAMPLE 3

In another test, a quantity of ground resin of acrylonitrile/styrene copolymer as above was divided into four samples. The first sample as indicated below was not irradiated and served as a control and the other samples were irradiated using a dose rate of about 1 Mrad/sec. and a Dynamitron to generate the electron beam as follows:

| Sample | Irradiation Dose In Megarads | Acrylonitrile Monomer ppm |
| --- | --- | --- |
| 1 | 0 | 19 |
| 2 | 0.1 | 15 |
| 3 | 0.5 | 11 |
| 4 | 1.0 | 10 |

The major reduction of the acrylonitrile monomer, 8 ppm, occurred at a dose level of 0.5 megarads while a small additional improvement, 1 ppm, occurred upon doubling of the dose to 1.0 megarad.

EXAMPLE 4

Two sets of fully formed bottles fabricated from the aforesaid acrylonitrile/styrene copolymer were irradiated at a dose level of 0.3 megarad using a dose rate of 1 Mrad per second and a Dynamitron to generate the electron beam. The first set of bottles had an initial acrylonitrile monomer content of approximately 10 ppm and the second set of bottles had a monomer content of approximately 5 ppm. After irradiation at the 0.3 megarad dose level, the first and second sets of bottles had monomer levels of 1.5 ppm and 0.5 ppm, respectively; such reductions lying in the 85% to 90% range.

Once given the above disclosure many other features, modifications and improvements will become apparent to the skilled artisan. Such other features, modifications and improvements are therefore considered a part of this invention, the scope of which is to be determined by the following claims.

What is claimed is:

1. A method for reducing the acrylonitrile monomer content in an acrylonitrile polymer which comprises exposing the polymer to ionizing radiation at an irradiation dosage level of from about 0.050–2.0 megarads at a rate sufficient to significantly reduce the extractable residual acrylonitrile monomer content in the polymer, wherein the polymer is not at or above its softening point during exposure to said ionizing radiation.

2. The method of claim 1 wherein the irradiation treatment is followed by an HCN outgassing treatment.

3. The method of claim 1 wherein the residual acrylonitrile monomer is reduced by more than about 50% by weight.

4. The method of claim 3 wherein the said residual acrylonitrile content is reduced by at least about 90% by weight.

5. The method of claim 1 in which the source of ionizing radiation is an electron beam.

6. The method of claim 1 wherein said acrylonitrile polymer is selected from the group consisting of acrylonitrile homopolymers and copolymers of acrylonitrile with ethylenically unsaturated monomers selected from the group consisting of styrene, butadiene and methyl acrylate or other acrylates.

7. The method of claim 1 wherein the polymer treated is in solution or suspension form.

8. A method according to claim 1 wherein said dosage level is from about 0.1–1.5 megarads.

9. A method according to claim 1 wherein said dosage level is from about 0.05–0.5 megarads.

10. A method according to claim 1 wherein exposing the polymer to ionizing radiation is conducted in at least two exposures, the total of which does not exceed from about 0.05–2.0 megarads.

11. A method for reducing the acrylonitrile monomer content in an acrylonitrile polymer which comprises exposing the polymer to ionizing radiation at an irradiation dosage level of from about 0.050–2.0 megarads at a rate sufficient to significantly reduce the extractable residual acrylonitrile monomer content in the polymer, wherein said acrylonitrile polymer is a copolymer comprised of from 55–85% by weight (of the total polymer weight) of acrylonitrile alone or acrylonitrile and methacrylonitrile in amounts up to 16% by weight (of the total polymer weight) and one or more comonomers selected from the group consisting of styrene, alpha methylstyrene, alpha olefins of 2-6 carbon atoms, $C_1$–$C_4$ akyl esters of acrylic and methacrylic acid, vinyl acetate, and $C_1$–$C_4$ alkyl vinyl esters.

12. A method according to claim 11 wherein said polymer is in the form of a packaging material.

13. A method for reducing the acrylonitrile monomer content in an acrylonitrile polymer which comprises exposing the polymer to ionizing radiation at an irradiation dosage level of from about 0.050–2.0 megarads at a rate sufficient to significantly reduce the extractable residual acrylonitrile monomer content in the polymer, wherein said polymer is a formed bottle or jar comprised of 60–83% by weight acrylonitrile.

14. The method of claim 13 wherein the article is a soft drink bottle.

15. A method for reducing the acrylonitrile monomer content in an acrylonitrile polymer comprising, providing the polymer to be treated in the form of a ground resin or pellet, exposing said polymer while in said ground resin or pellet form to a first dosage of ionizing radiation, thereafter forming the polymer into a finished article and exposing the polymer while in said finished article form to a second dosage of ionizing radiation, the total dosage of ionizing radiation not exceeding about 0.050–2.0 megarads.

16. A method according to claims 11, 13, 1 or 15 wherein the polymer prior to irradiation has an extractable acrylonitrile monomer content of about 1–100 ppm and said monomer content is reduced by at least 50 wt.% by said irradiation.

* * * * *